(12) United States Patent
Fujimori

(10) Patent No.: US 6,681,213 B2
(45) Date of Patent: *Jan. 20, 2004

(54) SYSTEM AND METHOD FOR PREVENTING UNAUTHORIZED DATA COPYING USING COMMUNICATION NETWORK

(75) Inventor: Junichi Fujimori, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 58 days.

(21) Appl. No.: 08/959,402

(22) Filed: Oct. 28, 1997

(65) Prior Publication Data

US 2002/0062217 A1 May 23, 2002

(30) Foreign Application Priority Data

Nov. 1, 1996 (JP) .............................................. 8-307320

(51) Int. Cl.$^7$ ............................................... G06F 17/60
(52) U.S. Cl. ........................................ 705/57; 713/153
(58) Field of Search ............................... 380/3–5, 9, 19, 380/23, 59, 255, 33, 42, 243; 705/1, 2, 57, 58; 709/223, 224; 713/153

(56) References Cited

U.S. PATENT DOCUMENTS

| | | | |
|---|---|---|---|
| 4,555,805 A | * 11/1985 | Talbot | 455/26 |
| 5,272,754 A | * 12/1993 | Boerbert | 380/25 |
| 5,517,568 A | * 5/1996 | Grube et al. | 380/23 |
| 5,586,185 A | * 12/1996 | Shibata et al. | 380/243 X |
| 5,815,571 A | * 9/1998 | Finley | 380/4 |
| 5,905,859 A | * 5/1999 | Holloway et al. | |

FOREIGN PATENT DOCUMENTS

WO  WO 8800416  *  1/1988

OTHER PUBLICATIONS

Snell "Tools Keep Web Surfing Safe, New Software Minimizes Restritions While Protecting the Network" Lan Times v 14, n. 1 p 7, Jan. 1997.*
No Author, "Network Security: AT&T Surity Data Network System Secures Both LANs & WANs" Edge, on & About AT&T v8 n 252 p19, May 1993.*
Makherjee et al. "Network Intrusion Detection" IEEE Network p 26–41, May 1994.*

* cited by examiner

Primary Examiner—M. Kemper
(74) Attorney, Agent, or Firm—Morrison & Foerster LLP

(57) ABSTRACT

An authorized node has a normal data input/output mode for directly inputting and outputting digital data without performing thereon specific data processing such as an encrypting process, and a protected data input/output mode for preventing digital data from being received by an unauthorized node. The protected data input/output mode is executed in one of two different forms: one form which causes the digital data, having undergone an encrypting process, to be input and output to and from a communication network; and the other form which does not involve input/output of the digital data via the communication network. A plurality of such authorized nodes are inter-connected to build a communication network which permits free data communication only between the authorized nodes. Upon detecting that any unauthorized node is newly connected to the communication network, a monitor node instructs the authorized nodes to conduct a data input/output operation in the protected data input/output mode. With such a monitor node connected to the communication network, unauthorized copying of data by the unauthorized node can be effectively prevented.

32 Claims, 7 Drawing Sheets

SYSTEM AND METHOD FOR PREVENTING UNAUTHORIZED DATA COPYING USING COMMUNICATION NETWORK

BACKGROUND OF THE INVENTION

The present invention relates to a system and method for preventing unauthorized copying of digital audio data or other data using a communication network.

Various known systems for preventing unauthorized copying of digital data or the like employ a scrampling-based method where a transmitting-end unit encrypts digital audio data themselves as by a scrambling process and a receiving end decrypts the encrypted data to reproduce the original digital data, and an ID-based method where either the transmitting-end unit or the receiving-end unit determines, on the basis of ID information pre-added to the header or the like of digital data, whether the copying in question is an authorized or unauthorized one.

The scrampling-based method, however, is not satisfactory in that the transmitting-end unit always has to encrypt the data themselves while the receiving-end unit always has to perform the decrypting process for reproduction, as noted earlier; namely, the transmitting-end and receiving-end units both bear considerable load because of use of the data encryption scheme. The ID-based method is also not satisfactory in that unauthorized copying can not be effectively prevented on the basis of the ID information in cases where either the transmitting-end or receiving-end unit employs an unfair or unauthorized device to rewrite the ID information itself or the receiving-end unit employs an unfair or unauthorized device to ignore the ID information.

SUMMARY OF THE INVENTION

It is therefore an object of the present invention to provide an unauthorized copying preventing system and method which can prevent data communication with an unauthorized instrument without a need to always modify the data themselves through specific data processing such as an encrypting process.

It is another object of the present invention to provide a monitor node and transmission/reception node which can be efficiently used for such an unauthorized copying preventing system and method.

According to a first aspect of the present invention, there is provided a system for preventing unauthorized copying of data through a communication network, which comprises: one or more authorized nodes connected to the communication network, each of the authorized nodes having a normal mode for directly inputting and outputting digital data via the communication network without performing thereon specific data processing such as an encrypting process and a protected mode for preventing the digital data outputted from the authorized node from being received by an unauthorized node connected to the communication network, each of the authorized nodes normally performing a data input/output operation via the communication network in the normal mode but, when the protected mode is instructed, performing the data input/output operation via the communication network in the protected mode; and a monitor node connected to the communication network for monitoring to determine whether any unauthorized node is connected to the communication network, the monitor node instructing the authorized nodes to perform the data input/output operation in the protected mode upon detection of the unauthorized node.

Each of the authorized nodes has a normal mode and a protected mode for its data input/output operation. On a communication network constituted only by authorized nodes, each of the nodes is allowed to freely input and output (communicate) data in the normal mode. The monitor node, which is also connected to the communication network, detects when an unauthorized node is connected to the network, and then instructs each of the authorized nodes to input and output data in the protected mode. By thus communicating the data in the protected mode, unauthorized copying of the data by the unauthorized node can be effectively avoided. Because the normal mode does not require such an encrypting process although some encrypting process is employed in the protected mode, load on the system can be considerably reduced as a whole.

Preferably, the authorized nodes and monitor node are freely connectable and disconnectable to and from the communication network, and the monitor node determines whether each of the nodes connected to the communication network is an authorized node and identifies every node other than the authorized nodes as the unauthorized node. The monitor node may determine whether any unauthorized node is connected to the communication network on the basis of detection of an additional node newly connected to the communication network. Each of the authorized nodes may send a newly-connected-node-detection confirming signal to the monitor node via the communication network in response to detection of an additional node newly connected to the communication network, and in response to the newly-connected-node-detection confirming signal, the monitor node may determine whether any unauthorized node is connected to the communication network. Preferably, the monitor node determines whether any unauthorized node is connected to the communication network, when the monitor node itself is connected to the communication network. In the above-mentioned manner, the monitor node is allowed to properly detect presence of any unauthorized node.

In a preferred implementation of the present invention, the monitor node sends an encrypted secret code to the communication network and thereby receives replies from the authorized nodes that the authorized nodes are duly authorized instruments. On the basis of the replies from the authorized nodes, the monitor node determines whether any unauthorized node is connected to the communication network. By employing an encrypted secret code as a means for determining whether the node in question is authorized without being recognized by an unauthorized node, unauthorized copying can be prevented even more effectively.

The protected mode allows the digital data to be communicated only between the authorized nodes by inputting and outputting, via the communication network, the digital data having undergone a predetermined encrypting process. Thus, in the protected mode, digital data flowing on the communication network can be reliably protected from being read by any unauthorized node connected to the communication network. Alternatively, the protected mode may prevent the digital data from being received by the unauthorized node by inhibiting input/output of the digital data from being conducted via the communication network. If the digital data are to be exchanged between the authorized nodes, then a dedicated or private line may be used between the two.

According to another aspect of the present invention, there is provided a monitor node which is connected to a communication network with at least one of authorized and unauthorized nodes connected thereto for distinguishing between the authorized and unauthorized nodes. The monitor node comprises: an input/output device that sends the communication network a predetermined encrypted code decodable by the authorized node and receives, from the authorized node having received and decoded the encrypted code, a reply that the authorized node is duly authorized; and a detection processing device that determines, from presence/absence of the reply, whether the node connected to the communication network is an unauthorized node.

Using the encrypted code that can not be understood or decoded by an unauthorized node, the monitor node can effectively prevent unauthorized copying. Also, by sending the encrypted code to the communication network with the unauthorized node connected thereto, it is possible to readily detect presence of the unauthorized node.

Preferably, the input/output device includes means that detects whether any additional node is newly connected to the communication network and sends the predetermined encrypted code to the communication network in accordance with a determination result provided by that means. With this arrangement, the monitor node detects presence of an unauthorized node when one of authorized and unauthorized nodes is newly connected to the communication network, and it does not have to wastefully perform the unauthorized node detecting process.

Preferably, at least one authorized node is connected to the communication network and the input/output device includes means that, via the communication network, receives, from the authorized node, a newly-connected-node-detection confirming signal indicating that an additional node is newly connected to the communication network, and wherein the input/output device sends the predetermined encrypted code to the communication network upon receipt of the newly-connected-node-detection confirming signal. This arrangement eliminates a need for the monitor node to constantly monitor the communication network so as to detect any newly-connected additional node. Further, because the newly-connected node detecting process is performed by the authorized node, processing load on the monitor node can be considerably reduced.

According to still another aspect of the present invention, there is provided a monitor node which is connected to a communication network with at least one of authorized and unauthorized nodes connected thereto for distinguishing between the authorized and unauthorized nodes. The monitor node comprises: an input/output device that, via the communication network, receives, from the authorized node, a newly-connected-node-detection confirming signal indicating that an additional node is newly connected to the communication network; and a detector device that, on the basis of the received newly-connected-node-detection confirming signal, determines whether the nodes connected to the communication network includes an unauthorized node. With this arrangement, the monitor node detects presence of an unauthorized node when one of authorized and unauthorized nodes is newly connected to the communication network, and it does not have to wastefully perform the unauthorized node detecting process.

According to still another aspect of the present invention, there is provided a transmission/reception node which is connected to a communication network for transmitting and receiving digital data via the communication network. The transmission/reception node comprises: a control device that controls input/output of the digital data though the communication network in a selected one of a normal mode and a protected mode, wherein the normal mode is a mode for directly inputting and outputting the digital data via the communication network without performing thereon specific data processing such as an encrypting process and the protected mode is a mode for preventing digital data outputted from the authorized node from being received by an unauthorized node connected to the communication network; an input/output device that sends a predetermined encrypted code to the communication network and, via the communication network, receives, from another node having received and decoded the encrypted code, a reply that the other node is duly authorized; a detector device that detects, from presence/absence of the reply, whether the other node connected to the communication network is an unauthorized node; and a mode selecting device that normally instructs the control device to select the normal mode, but, when an unauthorized node is detected by the detector device, instructs the control device to select the protected mode.

Like the above-mentioned monitor node, this transmission/reception node is capable of performing the unauthorized node detecting process. Thus, any unauthorized node can be detected without providing a particular monitor node on the communication network, so that unauthorized copying can be prevented effectively. The communication network may be constituted by a plurality of such transmission/reception nodes. In this case, an effective unauthorized copying preventing system can be readily built, because each of the transmission/reception nodes has the function of performing the unauthorized node detecting process.

According to still another aspect of the present invention, there is provided a transmission/reception node connected to a communication network for transmitting and receiving digital data via the communication network. The transmission/reception node comprises: a control device that controls input/output of the digital data through the communication network in a selected one of a normal mode and a protected mode, wherein the normal mode is a mode for directly inputting and outputting the digital data via the communication network without performing thereon specific data processing such as an encrypting process and the protected mode is a mode for preventing the digital data outputted from the authorized node from being received by an unauthorized node connected to the communication network; an input device that receives, via the communication network, an instruction to execute the protected mode; and a mode selecting device that normally instructs the control device to select the normal mode, but, when the instruction to execute the protected mode is received via the communication network, instructs the control device to select the protected mode. The transmission/reception node may further comprise a device that detects that any additional node is newly connected to the communication network and sends the communication network a newly-connected-node-detection confirming signal upon detection of the additional node newly connected to the communication network. If the communication network is constituted by a plurality of such transmission/reception nodes, it is no longer necessary for the monitor node to constantly monitor the communication network so as to detect any newly-connected additional node, and hence processing load on the monitor node can be considerably reduced.

The protected mode may prevent the digital data from being received by the unauthorized node by inputting/outputting the digital data having undergone a predetermined encrypting process. Thus, in the protected mode, digital data flowing on the communication network can be reliably protected from being read by any unauthorized node connected to the communication network. Alternatively, the protected mode may prevent the digital data from being received by the unauthorized node by inhibiting input/output of the digital data from being conducted via the communication network. If the digital data are to be exchanged between the authorized nodes, then a dedicated or private line may be used between the two nodes.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 1A:
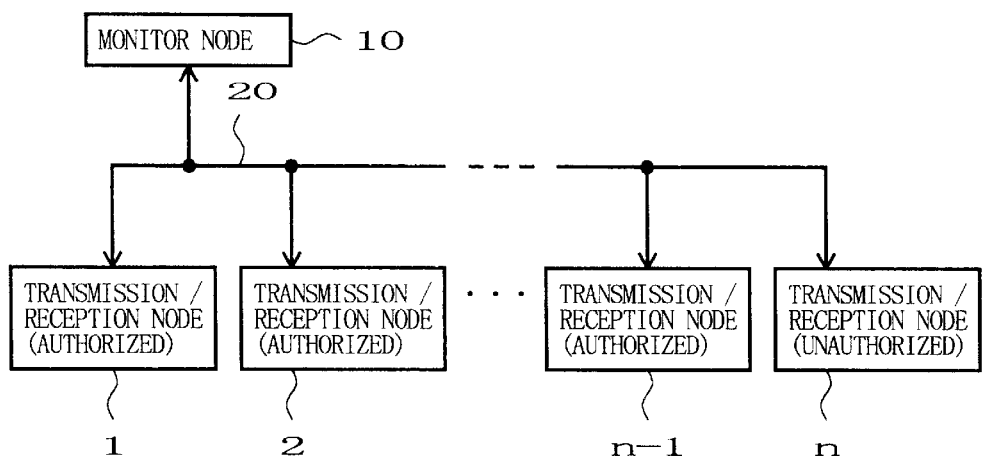
FIGS. 1A and 1B are schematic block diagrams illustrating an overall setup of an unauthorized copying preventing system in accordance with a first embodiment of the present invention.
Figure 1B:
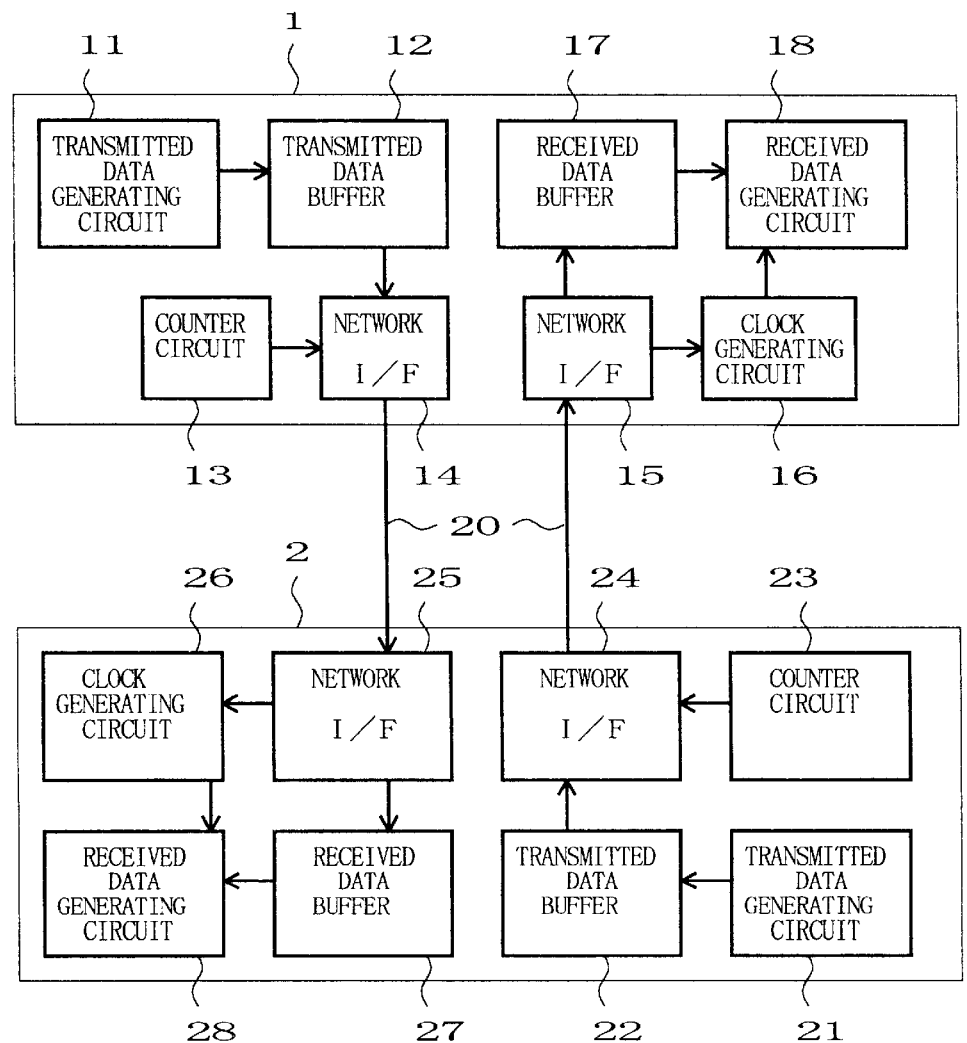
Figure 2:
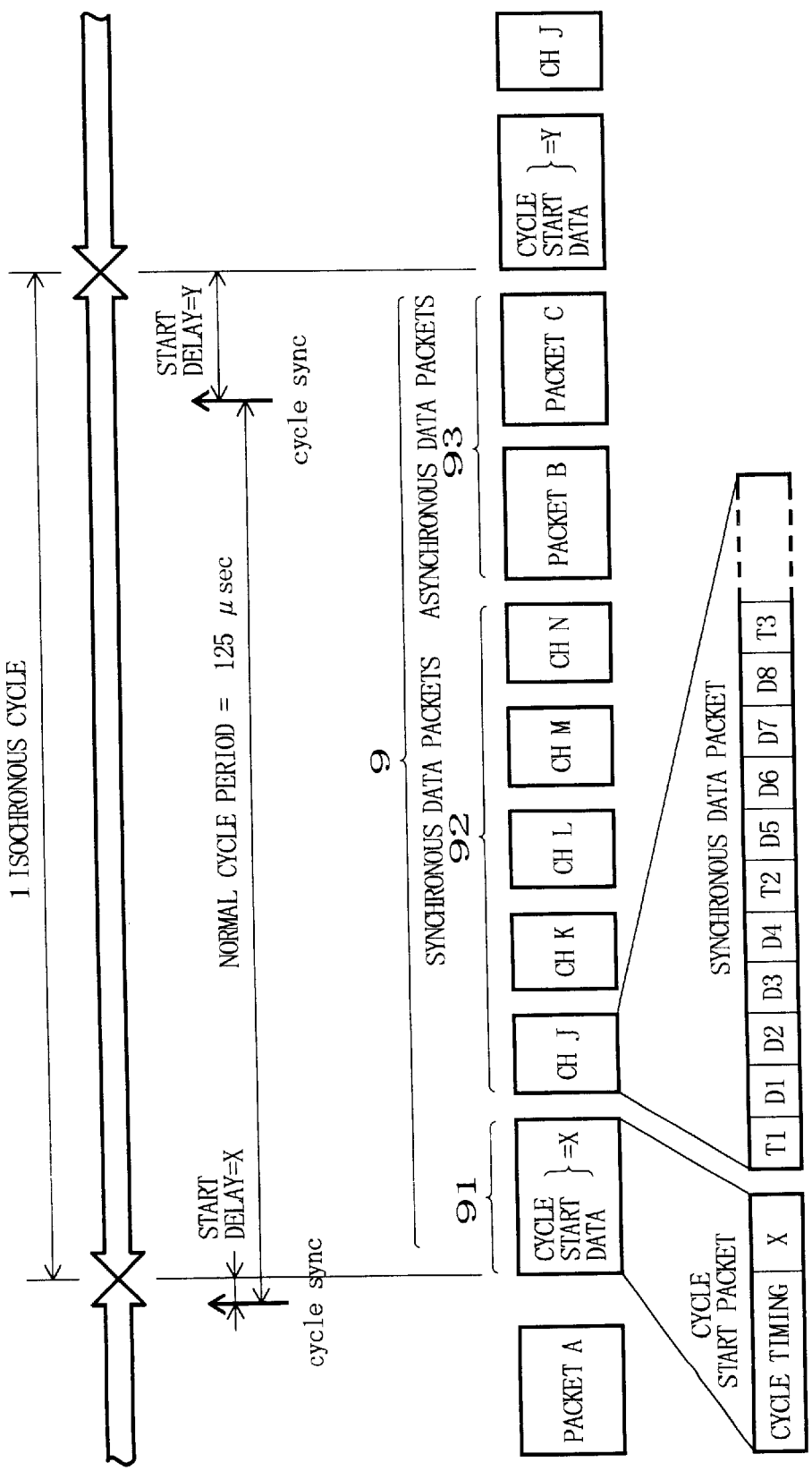
FIG. 2 is a diagram showing an example format of data transferred via the unauthorized copying preventing system of FIG. 1.

FIGS. 1A and 1B are schematic block diagrams illustrating an overall setup of an unauthorized copying preventing system in accordance with a first embodiment of the present invention, and FIG. 2 is a diagram showing an example format of data transferred via the unauthorized copying preventing system. The present invention will be described hereinafter in relation to a case where the data transfer is conducted in accordance with the "IEEE1394" communication scheme.

As shown in FIG. 1A, n (representing an optional number) transmission/reception nodes 1-n are connected with a monitor node 10 via a communication network 20. Here, the network 20 may be of the bus type, and the transmission/reception nodes 1-n may be interconnected via individual dedicated (or private) communication lines to constitute the network 20 which also permits communication among the transmission/reception nodes 1-n. For convenience of explanation, the data transfer between the transmission/reception nodes 1 and 2 will be described below with reference to FIG. 1B. Note that the data transfer between other transmission/reception nodes is conducted in a similar manner.

The preferred implementation will be described below in relation to a case where when the transmission/reception nodes n-1 are sequentially outputting cycle-start packet signals corresponding to synchronizing signals (cycle sync) of a 125 $\mu$sec. normal cycle period, the transmission/reception node 1 transmits a data train 9 as shown in FIG. 2 to the communication network 20 and the transmission/reception node 2 receives the data train 9 for subsequent reproduction.

In the transmission/reception node 1, a transmitted data generating circuit 11 operates in response to clock pulses of a predetermined frequency (e.g., 24.576 MHz (about 40 nsec. period)) which are generated by a built-in crystal quartz oscillator (not shown), so as to sequentially generate a time series of data of a predetermined sampling period T. For example, the transmitted data generating circuit 11 generates and outputs sequential sample data of digital audio signals, and it may include an audio recording/reproducing device such as a DAT (Digital Audio Tape recorder) or a tone synthesizer that synthesizes tone sample data on a real-time basis. The sampling period T of the output data from the transmitted data generating circuit 11 may be varied, as necessary, depending on a data source employed.

The output data from the transmitted data generating circuit 11 are temporarily stored into the transmitted data buffer 12 in order of the time series. The transmitted data buffer 12 is a buffer register which performs its input and output operations in an asynchronous manner.

Counter circuit 13 creates time stamp data and may be a 32-bit running counter for counting the clock pulses generated by the non-illustrated crystal quartz oscillator.

Each network interface 14 forms a data train 9 corresponding to one isochronous cycle as shown in FIG. 2 (hereinafter referred to as a "cycle packet train") on the basis of data temporarily stored in the data buffer 12 in synchronism with predetermined transmission interruption periods, i.e., the synchronizing signals (cycle sync) output from the transmission/reception node n-1 and then transmits the cycle packet train to the communication network 20.

As shown in FIG. 2, the cycle packet train 9 includes a cycle start packet 91, a group of synchronous data packets 92 and a group of asynchronous data packets 93. The cycle start packet 91 comprises 32 bit data, of which the upper 20 bit data indicate cycle timing of the cycle packet train 9 and the lower 12 bit data is cycle start data X indicative of a time delay with which the cycle packet train 9 has been supplied after the synchronizing signal (cycle sync) on the communication network 20.

The synchronous data packet group 92 comprises P (which is an optional plural number) data packets to be subjected to a quasi synchronous signal process. As an example, FIG. 2 shows five synchronous data packets of channel J to channel N. Further, each of the five synchronous data packets comprises a plurality of data groups each including Q (which is a predetermined number) data and time stamp data indicative of a time position of any one of the data (the first data in the present embodiment). According to the present embodiment, each of the data groups in the synchronous data packets includes one time stamp data T1, T2, ... for every four data D1–D4, D5–D8, ... Time stamp data T1 indicates the time position of the first data D1, time stamp data T2 indicates the time position of data D5. Thus, each of the synchronous data packets is an integer multiple of (Q+1) data. No that for convenience of digital audio data communication, the data transmission is sometimes conducted even when the packet has less data than the predetermined number Q, although not described here in detail.

The asynchronous data packet group 93 comprises R (which is an optional plural number) data packets to be subjected to an asynchronous signal process. As an example, FIG. 2 shows three asynchronous data packets B and C. In some cases, such an asynchronous data packet need not be included in the cycle packet train 9.

In the transmission/reception node 2, a network interface 24 receives a cycle packet train 9 transmitted via the communication network 20 and temporarily stores the received packet data into a received data buffer 27 in a time-series fashion in order of their reception. The received data buffer 27 is a buffer register where input/output takes place asynchronously. On the basis of cycle start data X in the cycle-start packet of the received cycle packet train 9, a clock generating circuit 26 reproduce a same original sampling period T as that of data supplied from the transmitted data generating circuit 11 of the transmission/reception node 1.

In accordance with the reproduced sampling period T given from the clock generating circuit 26, a received data generating circuit 28 sequentially reads out the temporarily stored data from the received data buffer 27. The data thus read out may be used for any desired purpose in any optional manner. For example, the read-out data may be subjected to D/A (Digital-to-Analog) conversion so as to be sounded through a speaker directly or after undergoing a particular process, such as an effect imparting process, or may just be supplied to the outside.

Note that where the transmission/reception node 1 operates as a receiving-end unit and the transmission/reception node 2 operates as a transmitting-end unit, similar operations take place via the network interface 24, communication network 20 and network interface 15.

Figure 3:
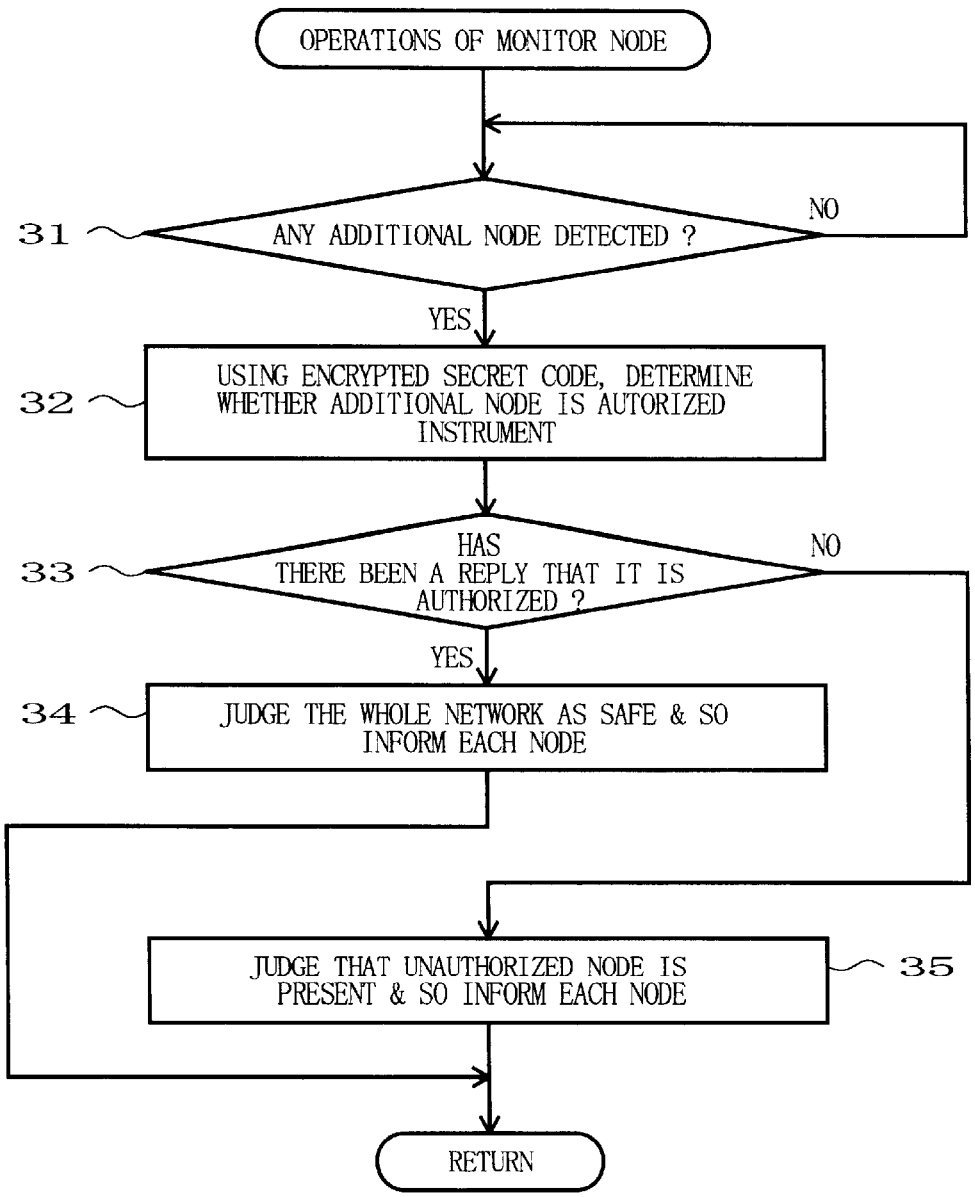
FIG. 3 is a flowchart showing an example of various operations performed by a monitor mode of FIG. 1 in order to implement the unauthorized copying preventing system of the present invention.

Now, the monitor node 10 will be described with reference to a flowchart of FIG. 3 showing an example of various operations performed by the monitor mode 10 of FIG. 1 in order to implement the unauthorized copying preventing system of the present invention. Let's assume here that the monitor node 10 has already been connected to the communication network 20 constituted by the regular or authorized transmission/reception nodes 1-n-1.

Before an additional node n is newly connected to the communication network 20, the monitor node 10 repetitively carries out the operation of step 31. Upon detection of an additional node n newly connected to the communication network 20, the monitor node 10 proceeds to step 32, where it is ascertained, using an encrypted secret code, whether the newly-connected additional node n is a proper or authorized transmission/reception node. If the newly-connected additional node n is an authorized transmission/reception node as determined at step 32, the node n sends back a reply that it is duly authorized; if not, the additional node n makes no reply. Then, at step S33, it is determined whether or not there has been the reply from the newly-connected additional node n that it is duly authorized. If there has been such a reply (YES), the monitor node 10, at step 34, judges that the newly-connected additional node n is an authorized transmission/reception and the communication network 20 is still safe as a whole and so informs each of the other nodes 1-n-1. If there has been no reply (NO) from the newly-connected additional node n as determined at step 33, it means that the additional node n is a kind of unauthorized transmission/reception node, so that the monitor node 10, at step 35, informs each of the other nodes 1-n-1 that a non-regular or unauthorized transmission/reception node is also present on the communication network 20.

Once the other nodes 1-n-1 are informed that the communication network 20 is safe, they are brought to a normal data input/output mode to freely conduct data exchange on the communication network 20. On the other hand, when the other nodes 1-n-1 are informed that a non-regular or unauthorized transmission/reception node is also present on the communication network 20, they are brought to a protected data input/output mode. In the protected data input/output mode, they exchange data with an authorized transmission/reception node via an individual dedicated communication line rather than via the communication network 20, or performing an encrypting process, such as by scrambling, on digital data themselves to be sent to the communication network 20, so as to prevent the non-regular or unauthorized node n from unfairly reading the data flowing on the communication network 20.

By providing the above-mentioned monitor node 10 on the communication network 20 pre-constituted only by the regular or authorized transmission/reception nodes 1-n-1, it is possible to effectively prevent unauthorized copying of digital data, because transmission/reception of the digital data is disabled or inhibited on the communication network 20 or the data are encrypted such as by scrampling when an authorized node n is newly connected to the network 20.

Figure 4A:
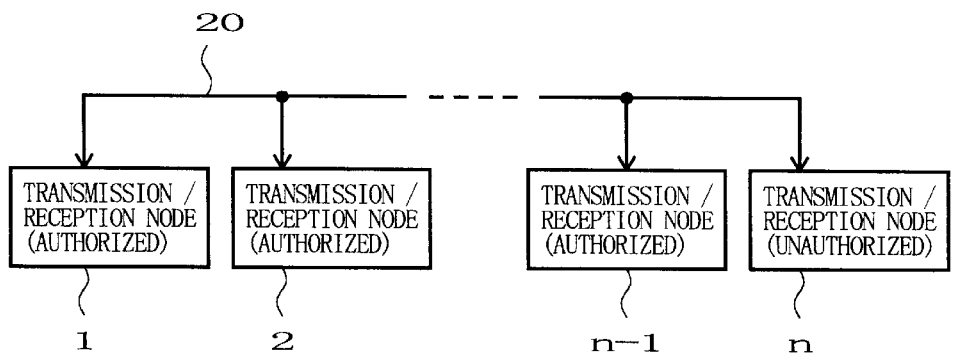
FIG. 4A is a schematic block diagram illustrating an overall setup of an unauthorized copying preventing system in accordance with a second embodiment of the present invention.
Figure 4B:
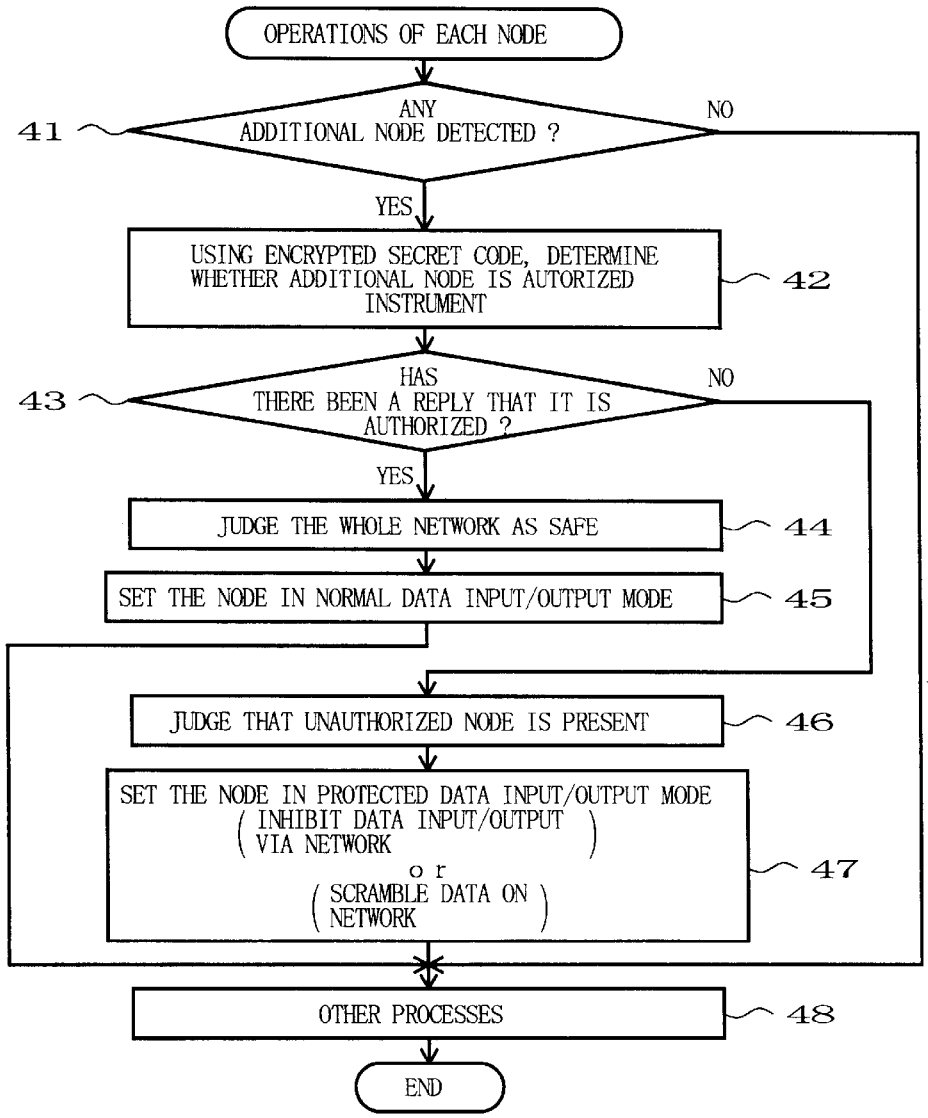
FIG. 4B is a flowchart showing an example of various operations performed by each of a plurality of transmission/reception nodes in the second embodiment of FIG. 4A.

The embodiment of FIG. 1A has been described above in relation to the case where the monitor node 10 is provided on the communication network 20 so as to detect presence/absence of a newly-connected additional node and determine whether the newly-connected additional node is an authorized node. But, according to the present invention, the monitor node 10 may be omitted and each of the regular transmission/reception nodes 1-n-1 may be arranged to operate in a similar manner to the above-described monitor node 10. FIGS. 4A and 4B are explanatory of such an example where each of the regular transmission/reception nodes 1-n-1 is arranged to operate like the monitor node 10; that is, the illustrated example of FIG. 4A is different from the example of FIG. 1A in that no monitor node is connected to the communication network 20 and hence each of the regular transmission/reception nodes 1-n-1 operates in a manner as shown in FIG. 4B.

Namely, each of the regular transmission/reception nodes 1-n-1 determines at step 41 whether or not any additional transmission/reception node has been newly connected to the communication network 20. If so, the transmission/reception node proceeds to next step 42, but if not, the transmission/reception node jumps to step 48 to carry out various operations peculiar to the node (other processes). At step 42, it is ascertained, using an encrypted secret code, whether or not the newly-connected additional node n is an duly authorized transmission/reception node. If the additional node n is an authorized transmission/reception node, the node n replies that it is duly authorized; if not, the additional node n makes no such reply. Then, at step S43, it is determined whether or not the additional node n has replied that it is an authorized node. If there has been such a reply (YES), the monitor node 10 judges at step 44 that the newly-connected additional node n is an authorized transmission/reception node and the communication network 20 is still safe as a whole. At next step 45, the transmission/reception node is placed in the normal data input/output mode, where data input/output takes place in a normal manner when data are communicated via the communication network 20 in the other processes of step 48.

On the other hand, if there has been no reply as determined at step 43, it means that the newly-connected additional node n is a kind of unauthorized transmission/reception node, so that the monitor node 10 judges at step 46 that an unauthorized transmission/reception node is also present on the communication network 20 and places each of the other transmission/reception nodes 1-n-1 in the protected data input/output mode at step 47. In the protected data input/output mode, each of the regular transmission/reception nodes 1-n-1 exchanges data with any of the other authorized transmission/reception nodes via the individual communication line rather than inputting or outputting data via the communication network 20, or performing an encrypting process, such as scrambling, on digital data themselves to be sent to the communication network 20, so as to prevent the unauthorized node n from unfairly reading the data flowing on the communication network 20.

By allowing each of the regular transmission/reception nodes 1-n-1 to operate like the above-mentioned monitor node 10, it is possible to effectively prevent unauthorized copying of digital data, because transmission/reception of the digital data is disabled or inhibited on the communication network 20 or the data are encrypted such as by scrampling when an authorized transmission/reception node n is newly connected to the network 20.

In the case where the monitor node 10 is provided on the communication network 20 as in the illustrated example of FIG. 1A, a determination can be properly made as to whether any additional transmission/reception node newly connected to the network 20 is an authorized instrument or not, as mentioned earlier. However, the provision of the monitor node 10 on the communication network pre-built by a plurality of transmission/reception nodes can not determine whether each of the component transmission/reception nodes is an authorized instrument or not.

Further, in the case where each of the transmission/reception nodes has functions similar to those of the monitor node as in the illustrated example of FIGS. 4A and 4B, a communication network can be properly built using these nodes. However, if a transmission/reception node that does not have functions similar to those of the monitor node is newly connected to the communication network, there is no guarantee that it can operate effectively. More specifically, as long as the newly-connected additional transmission/reception node is duly authorized, it can reply that it is an authorized instrument as in the example of FIG. 1A and the communication network can be judged as safe. But, if the newly-connected additional transmission/reception node is not authorized, the node not having the functions of the monitor node can not identify the additional node as unauthorized at all and can not recognize the shifting, of the entire communication network, to the protected data input/output mode, so that data transfer can not be carried out effectively.

So, according to another aspect of the present invention, each of the transmission/reception nodes is arranged to have a function of detecting whether any additional node has been newly connected to the communication network 20, as part of the functions of the monitor node 10 shown in FIG. 1A. Thus, on the basis of a signal indicative of the newly-connected additional node detected by and output from each of the transmission/reception nodes (hereinafter called a "newly-connected-node-detection confirming signal"), the monitor mode 10 determines, using an encrypted secret code, whether the existing transmission/reception nodes as well as the newly-connected additional transmission/reception node are all an authorized node.

Now, such operations taking place between the monitor mode 10 and the individual transmission/reception nodes will be described by way of example, with reference to flowcharts of FIGS. 5 and 6. Specifically, FIG. 5 is a flowchart showing an example of various operations performed by each of the transmission/reception nodes in a third embodiment of the present invention, and FIG. 6 is a flowchart showing an example of various operations performed by the monitor mode in the third embodiment.

Figure 5:
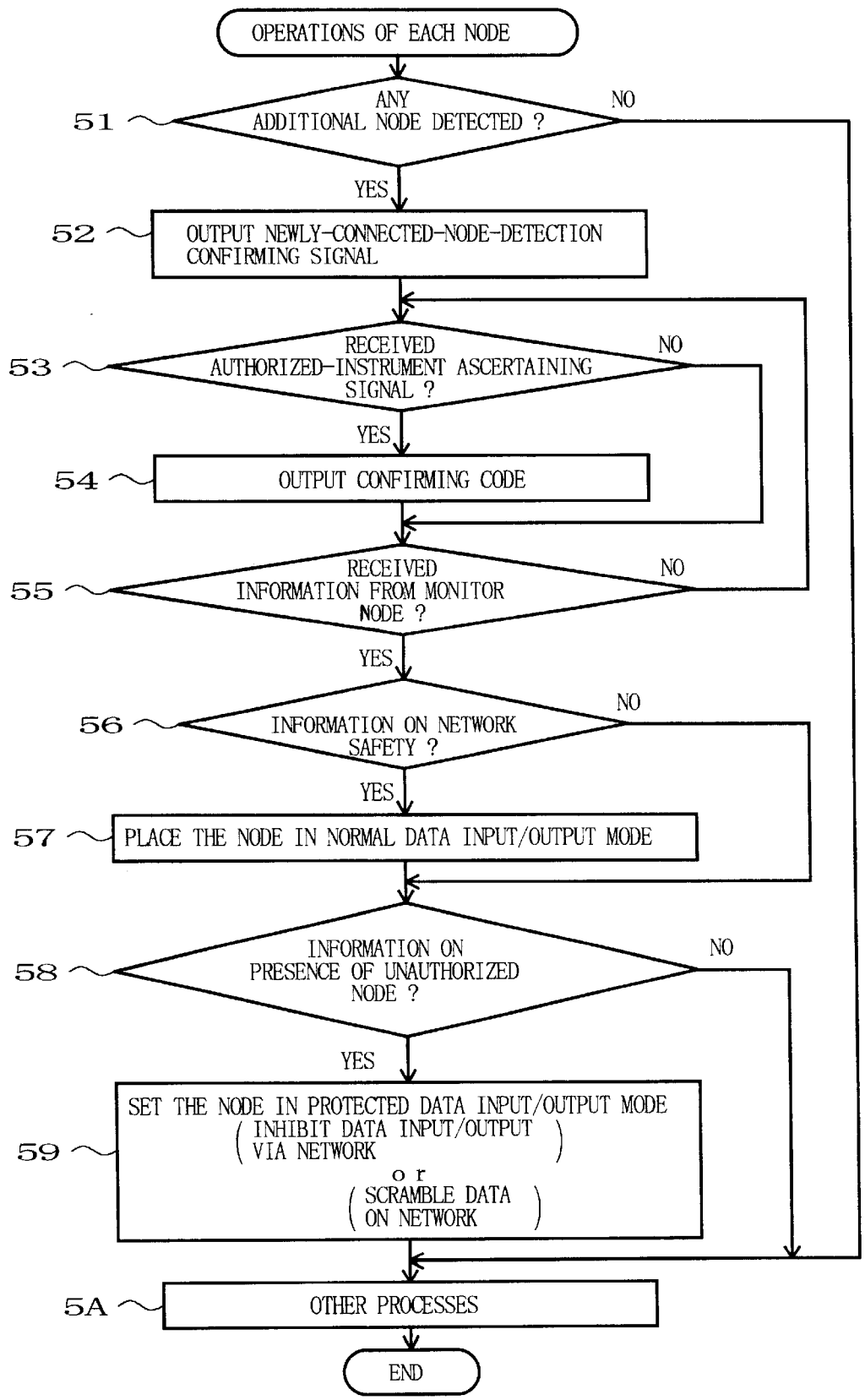
FIG. 5 is a flowchart showing an example of various operations performed by each of a plurality of transmission/reception nodes in a third embodiment of the present invention.
Figure 6:
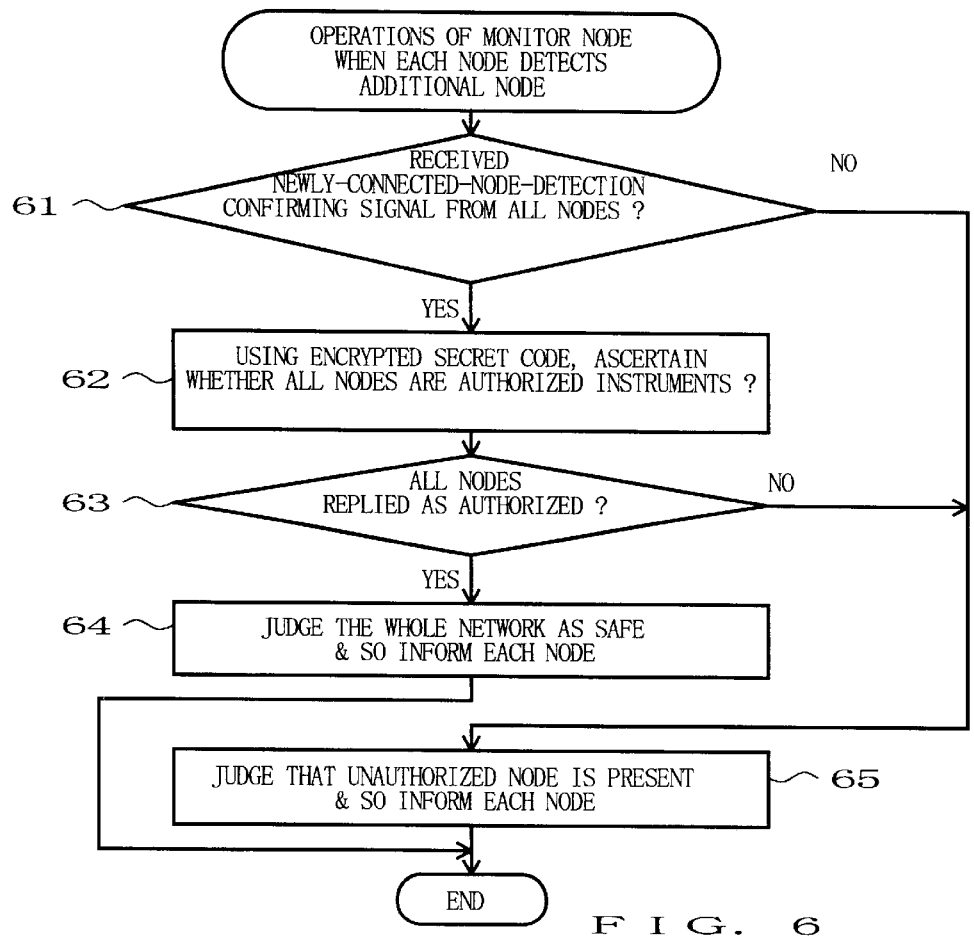
FIG. 6 is a flowchart showing an example of various operations performed by the monitor mode in the third embodiment.

At step 51 of FIG. 5, each of the transmission/reception nodes 1-n determines whether an additional transmission/reception node has been newly connected to the communication network 20, i.e., whether any newly-connected additional node has been detected. If answered in the affirmative (YES), the flow proceeds to next step 52; otherwise, the flow jumps to step 5A to carry out various operations peculiar to the node (other processes). When an additional transmission/reception node n has been newly connected to the existing communication network 20 constituted by the regular transmission/reception nodes 1-n-1, these nodes 1-n-1 identify the additional transmission/reception node n as a newly-connected node and the transmission/reception node n also identifies the other transmission/reception nodes 1-n-1 as newly-connected nodes. Therefore, in such a case, all of the transmission/reception nodes 1-n detect the newly-connected node (nodes), so that each of the transmission/reception nodes 1-n goes to step 52 so as to output to the communication network 20 a signal confirming that a newly-connected node or nodes have been detected (newly-connected-node-detection confirming signal).

When each of the regular transmission/reception nodes has detected a newly-connected node or nodes in the above-mentioned manner, the monitor node 10 in this example sends each of the nodes a signal to ascertain whether the newly-connected node or nodes are an authorized instrument (authorized-instrument ascertaining signal) and informs each of the nodes 1-n that the communication network 20 is safe or that at least one unauthorized transmission/reception node is present on the communication network 20. Then, each of the nodes 1-n determines at step 53 whether it has received the authorized-instrument ascertaining signal, and if so (YES), it proceeds to step 54 so as to output a code confirming that it is an authorized instrument (confirming code). If the authorized-instrument ascertaining signal has not been received from the monitor node 10 as determined at step 53 (NO), the flow jumps to step 55, where a determination is made as to whether the monitor node 10 has informed the node that the communication network 20 is safe as a whole or that at least one unauthorized transmission/reception nodes is present on the communication network 20. If such information has been received from the monitor node 10 (YES), various operations are performed at steps 56 to 59 depending on the type of the received information. If, on the other hand, no such information has been received from the monitor node 10 (NO), the flow loops back to step 53 so as to repeat the operations of steps 53 to 55 until the information is received from the monitor node 10.

When the monitor node 10 has informed that the communication network 20 is still safe as a whole as determined at step 55, an affirmative determination results at step 56, so that each of the transmission/reception nodes 1-n is placed, at step 57, in the normal data input/output mode where data input/output takes place in a normal manner when data are communicated via the communication network 20 in the other processes of step 5A. When the monitor node 10 has informed that at least one unauthorized transmission/ reception nodes is present on the communication network 20, only instruments of the authorized transmission/ reception nodes are placed in the protected data input/output mode at step 59. Thus, each of the authorized transmission/ reception nodes exchanges data with any of the other authorized transmission/reception nodes via an individual communication line rather than inputting or outputting data via the communication network 20, or performs an encrypting process, such as by scrambling, on digital data themselves to be sent to the communication network 20, so as to prevent the unauthorized nodes from reading the data flowing on the communication network 20.

Next, a description will be made about exemplary behavior of the monitor node with reference to FIG. 6.

When an additional node n has been newly connected to the communication network 20, the exiting or regular transmission/reception nodes 1-n-1 and the newly-connected additional node n output newly-connected-node-detection confirming signals, as previously stated in relation to step 52 of FIG. 5. Then, the monitor node 10, at step 61, sequentially receives the newly-connected-node-detection confirming signals from the transmission/reception nodes 1-n and determines, within a predetermined period after receipt of the first newly-connected-node-detection confirming signal, whether such newly-connected-node-detection confirming signals have been received from all of the transmission/reception nodes 1-n. With an affirmative determination (YES), the monitor node 10 proceeds to next step 62, but if such a newly-connected-node-detection confirming signal has not been received from at least one of the nodes (NO), it jumps to step 65.

A negative determination will result at step 61 when the newly-connected additional node is an unauthorized instrument, or when the existing transmission/reception nodes 1-n-1 include at least one unauthorized instrument, or when the newly-connected additional node n is an unauthorized instrument and at the same time the existing transmission/reception nodes 1-n-1 include at least one unauthorized instrument. Thus, in these cases, the monitor node 10, at step 65, determines that at least one unauthorized instruments is also present on the communication network 20 and outputs to the network 20 information on the presence of the unauthorized transmission/reception node.

If, on the other hand, an affirmative (YES) determination results at step 61, it means that the newly-connected-node-detection confirming signals have been received from all the transmission/reception nodes 1-n including the newly-connected additional node n. Thus, it can be said that all the transmission/reception nodes 1-n currently connected to the communication network 20 are instruments capable of outputting the newly-connected-node-detection confirming signal. Consequently, at next step 62, the monitor node 10 outputs to the communication network 20 the encrypted secret code to ascertain whether all the transmission/ reception nodes 1-n currently connected to the communication network 20 are duly authorized instruments.

Next, at step 63, the monitor node 10 determines whether all the transmission/reception nodes 1-n have replied that they are authorized. That is, because every authorized transmission/reception node 1-n on the communication network 20 is supposed to output to the network 20 the reply that it is duly authorized, the monitor node 10, in effect, determines whether such a reply has been received from all the transmission/reception nodes 1-n. If determined in the affirmative (YES), the monitor node 10 proceeds to next step 64, while if such a reply has not been received from at least one of the nodes 1-n, it jumps to step 65. At step 64, the monitor node 10 judges that the entire communication network 20 is safe now that all the connected transmission/ reception nodes 1-n are found to be authorized and sends the communication network 20 the information that the entire communication network 20 is safe.

The operation of step 65 is executed when the negative determination is made at step 61 or 63. That is, if the determination is in the negative at step 61, it means that at least one of the transmission/reception nodes 1-n has not output the newly-connected-node-detection confirming signal to the communication network 20 despite the fact that the additional node n has been newly connected to the network 20. If the determination is in the negative at step 63, it means that despite the affirmative determination at step 61, at least one of the transmission/reception nodes 1-n has not replied that it is duly authorized in response to the encrypted secret code. More specifically, it means that at least one of the transmission/reception nodes 1-n is a kind of unauthorized transmission/reception node, so that the monitor node 10 judges at step 65 that at least one unauthorized transmission/ reception node is present on the network 20 and output to the network 20 the information to that effect. Then, every authorized transmission/reception node, of the currently connected nodes 1-n, is placed in the protected data input/ output mode at step 59.

As set forth above, the present embodiment is characterized in that each of the transmission/reception nodes is arranged to have a function of detecting whether any additional node has been newly connected to the communication network 20 and that on the basis of the newly-connected-node-detection confirming signal from each of the transmission/reception nodes, the monitor mode 10 determines, using the encrypted secret code, whether the existing transmission/reception nodes as well as the newly-connected additional transmission/reception node are all an authorized node. Such an arrangement can reliably detect presence, on the communication network 20, of any unauthorized transmission/reception node by only connecting the monitor mode 10 to the network 20 pre-built by a plurality of transmission/reception nodes.

Whereas the operations of FIG. 5 have been described in relation to the case where the transmission/reception nodes 1-n-1 and the monitor node 10 are pre-connected to the communication network 20 and a detection is made of an additional transmission/reception node n newly connected to the network 20, only the transmission/reception nodes 1-n-1 may be connected to the communication network 20 and these transmission/reception nodes 1-n-1 may be arranged to perform the operations of FIG. 5 when the monitor node is newly connected to the network. In this case, by temporarily connecting the monitor node to the communication network constituted by the regular transmission/reception nodes alone, a determination can be made as to whether the network is safe or unsafe with some unauthorized transmission/reception node present, to thereby selectively set the data input/output mode of each of the transmission/ reception nodes in the normal or protected data mode.

Further, the preferred embodiments have been described in connection with the communication network comprised of a plurality of transmission/reception nodes capable of transmitting and receiving digital data. If a transmission node, such as a microphone or keyboard, only capable of transmitting digital audio data is connected to such a communication network, the transmission node must have at least a function of responding to a signal ascertaining whether it is an authorized instrument (i.e., authorized-instrument ascertaining signal).

Figure 7:
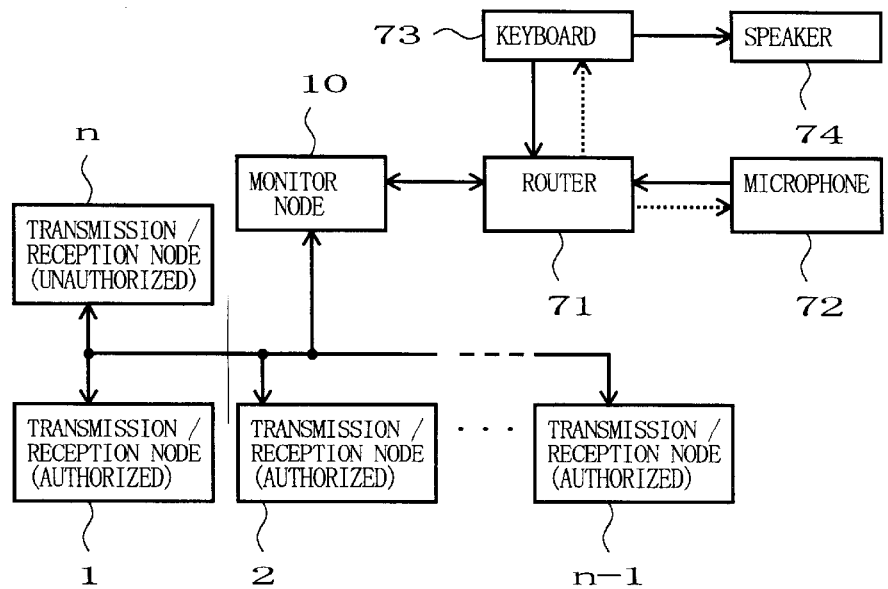
FIG. 7 is a schematic block diagram illustrating an overall setup of an unauthorized copying preventing system in accordance with a fourth embodiment of the present invention.

However, because it is not easy to add such a responding function to the transmission node that is so simplified in structure to perform the transmission alone, a router may be provided between the monitor node and the transmission/reception nodes so as to connect the transmission note to the communication network 20 by way of the router, as shown in FIG. 7. In FIG. 7, a microphone 72 and a keyboard 73 are the transmission nodes, which supply digital audio data to the router 71. The router 71 outputs the digital audio data from the microphone 72 and keyboard 73 to the communication network 20. Via the monitor node 10, the router 71 receives data on the communication network 20 and outputs to the microphone 72 and keyboard 73 only synchronizing signals (cycle sync) of a normal cycle period of 125 $\mu$sec., contained in the received data, that are generated from the transmission/reception nodes n-1. In response to the synchronizing signals, the microphone 72 and keyboard 73 output the digital audio data. In FIG. 7, the synchronizing signals output from the router 71 to the microphone 72 and keyboard 73 are denoted in broken-line arrows. The digital audio data from the keyboard 73 are also supplied to a speaker 74, where they are subjected to a D/A (Digital-to-Analog) conversion process and then audibly reproduced or sounded. If the router 71 is arranged to have the function of responding to the authorized-instrument ascertaining signal, it can be directly connected to the communication network 20 rather than via the monitor node 10.

Whereas the preferred embodiments have been described in connection with the operations performed when an unauthorized transmission/reception node is found on the communication network 20, the authorized transmission/reception nodes once placed in the protected data input/output mode may be shifted to the normal data input/output mode after detecting that the unauthorized transmission/reception node is removed from the network 20.

Figure 8:
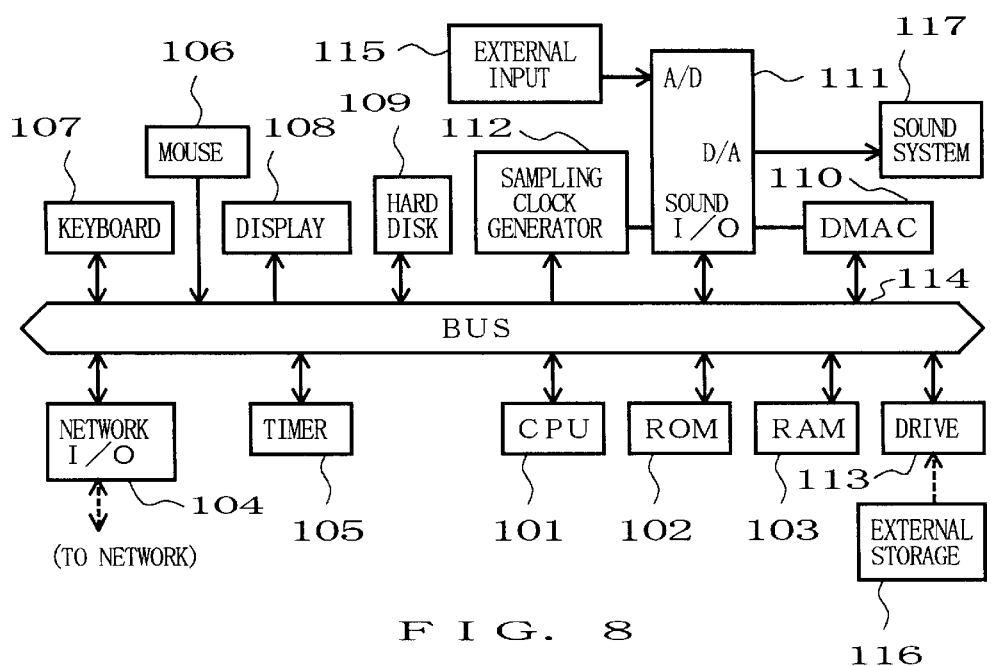
FIG. 8 is a block diagram showing a hardware setup of a device, such as a personal computer, which can be used as the transmission/reception node and monitor node of FIG. 2.

FIG. 8 is a block diagram showing a hardware setup of a device, such as a personal computer, which can be used as the transmission/reception node and monitor node of FIG. 2.

In the system of FIG. 8, a CPU (Central Processing Unit) 101 is used as a main control section, under the control of which are executed various processing programs as shown in FIGS. 3 to 6. To the CPU 101 are connected, via a data and address bus 114, a ROM (Read-Only Memory) 102, a RAM (Random Access Memory) 103, a communication network I/O (Input/Output device) 104, a timer 105, a mouse 106, a keyboard 107, a display 108, a hard disk 109, a DMAC (Direct Memory Access Controller) 110, a sound I/O (Input/Output device) 111, a sampling clock generator 112, an external memory drive 113, etc.

The sound I/O 111 is a sound input/output device commonly called a "CODEC", which contains a digital-to-analog converter (DAC), an analog-to-digital converter (ADC), an input FIFO (First-In-First-Out buffer) connected with the ADC, an output FIFO connected with the DAC, etc. Analog audio signal is supplied from an external audio signal input terminal 115 to the ADC in the sound I/O 111, so that the supplied audio signal is converted to a digital audio signal to be then fed to the input FIFO. When data is present in the input FIFO, a signal requesting execution of a sound recording process is output to the DMAC 110. The DMAC 110 receives the analog audio data from the input FIFO in response to the sound recording process request from the sound I/O 111 and delivers the analog audio data via the bus 114 to the internal memory, such as the RAM 103, for storage therein.

An external recording medium 116, such as a floppy disk, CD-ROM (Compact Disk Read-Only Memory) or MO (Magneto Optical Disk), is removably attachable to the external memory drive 113 for data read/write by the drive 113. Such an external recording medium 116 may be used to store therein control programs as shown in FIGS. 3 to 6 and other programs or to store audio data and the like. For example, the external recording medium 116 storing audio data to be transmitted is set in the external memory drive 113 so that the drive 113 reads out the audio data from the recording medium 116 to deliver the read-out data via the bus 114 to the internal memory, such as the RAM 103, for storage therein.

Where the system of FIG. 8 performs transmitting operations, the CPU 101 executes a transmission processing program and the audio data stored in the RAM 103 to the communication network 20 (FIG. 1) via the communication network I/O 104.

On the other hand, where the system of FIG. 8 performs receiving operations, the CPU 101 executes a reception processing program as shown and receives the audio data delivered via the communication network I/O 104 and communication network 20 (FIG. 1) to store the received data into the internal memory such as the RAM 103. Also, a frequency of clock pulses generated by the sampling clock generator 112 is variably set in accordance with the received sampling clock frequency. The received audio data stored in the RAM 103 may be preserved in the hard disk 109 or external recording medium 116 or read out under the control of the DMAC 110 for sounding through the sound system 117. In such a case, the DMAC 110 reads out the audio data from the output buffer, sample by sample, in accordance with the direct memory access scheme in synchronism with reproduction sampling clock pulses from the sound I/O 111. The sound I/O 111 writes the audio data into its internal output FIFO and then reads out the data from the output FIFO in accordance with the sampling clock pulses to transfer the read-out data to the DAC for digital-to-analog conversion. The resultant converted waveform data is then supplied to the sound system 117 for audible reproduction or sounding therethrough.

The processing programs of the present invention as shown in FIGS. 3 to 6 may be stored in any of the ROM 102, RAM 103, hard disk 109 and external recording medium 116.

Further, the system of FIG. 8 may be connected via the communication network I/O 104 to a communication network so that it can receive the transmission or reception processing program from an external server computer (not shown) and transfer the received program to the RAM 103 or hard disk 109 within the computer or the external recording medium 116 for storage therein.

In summary, the present invention having been described so far can provide an unauthorized copying preventing system which can effectively prevent data exchange with an unauthorized instrument without a need to always modify the data themselves such as by an encrypting process.

What is claimed is:

1. A system for preventing unauthorized copying of data through a bus-type communication network comprising:
   one or more authorized nodes connected to the communication network, each of said authorized nodes having an unprotected mode for directly inputting and outputting digital data via the communication network without performing thereon cryptographic data processing, and a protected mode for inputting and outputting digital data via the communication network while performing cryptographic data processing thereon to thereby prevent the digital data outputted from said authorized node from being utilized by an unauthorized node connected to the communication network; and a monitor node connected to the communication network for monitoring the communication network to determine whether any unauthorized node is connected to the communication network, wherein when said monitor node determines that no unauthorized node is connected to the communication network, said authorized nodes perform the input/output operation in the unprotected mode, wherein when said monitor node determines that an unauthorized node is connected to the communication network, said monitor node instructs said authorized nodes to shift the input/output operation from the unprotected mode to the protected mode, and wherein when the monitor node determines that the unauthorized node connected to the communication network has been removed from the communication network, said monitor node instructs said authorized nodes to shift the input/output operation from the protected mode to the unprotected mode.

2. A system as recited in claim 1 wherein said authorized nodes and monitor node are freely connectable and disconnectable to and from the communication network and wherein said monitor node determines whether each of the nodes connected to the communication network is an authorized node and identifies every node other than said authorized nodes as the unauthorized node.

3. A system as recited in claim 1 wherein said monitor node detects that any additional node is newly connected to the communication network, and wherein said monitor node determines whether any unauthorized node is connected to the communication network upon detection of the additional node newly connected to the communication network.

4. A system as recited in claim 1 wherein each of said authorized nodes sends a detection signal to said monitor node via the communication network in response to detection of an additional node newly connected to the communication network, and in response to the detection signal, said monitor node determines whether any unauthorized node is connected to the communication network.

5. A system as recited in claim 1 wherein said monitor node determines whether any unauthorized node is connected to the communication network, when said monitor node itself is connected to the communication network.

6. A system as recited in claim 1 wherein said monitor node sends an encrypted secret code to the communication network and thereby receives replies from said authorized nodes that said authorized nodes are duly authorized instruments, and on the basis of the replies from said authorized nodes, said monitor node determines whether any unauthorized node is connected to the communication network.

7. A system as recited in claim 1 wherein said protected mode allows the digital data to be communicated only between said authorized nodes by inputting and outputting, via the communication network, the digital data having undergone a predetermined encrypting process.

8. A system as recited in claim 1 wherein said protected mode prevents the digital data from being received by said unauthorized node by inhibiting input/output of the digital data from being conducted via the communication network.

9. A monitor node connected to a bus-type communication network with a plurality of nodes connected thereto for determining whether said plurality of nodes are authorized or unauthorized, said monitor node comprising:

an input/output device that sends the communication network a predetermined encrypted code decodable by the authorized node and receives, from said authorized node having received and decoded the encrypted code, a reply that indicates whether said authorized node is duly authorized;

a detection processing device that determines, in response to the reply received by said input/output device, whether the node connected to the communication network is an authorized node or an unauthorized node; and a control device that, when said detection processing device determines that at least one of the nodes is an unauthorized node while the nodes are operating in an unprotected mode of communication, controls the nodes to shift from the unprotected mode of communication to a protected mode of communication, and when said detection processing device determines that all of the nodes are authorized nodes while the nodes are operating in the protected mode of communication, controls the nodes to shift from the protected mode of communication to the unprotected mode of communication, wherein the unprotected mode of communication is a mode for directly inputting or outputting digital data without performing an encryption process, and the protected mode of communication is a mode for inputting and outputting digital data while using an encryption process to thereby prevent any unauthorized node from using digital data output from any one of the authorized nodes.

10. A monitor node as recited in claim 9 which further comprises a detection section that detects whether any additional node is newly connected to the communication network, and wherein said input/output device sends the predetermined encrypted code to the communication network upon detection of the additional node newly connected to the communication network.

11. A monitor node as recited in claim 9 wherein a plurality of said authorized nodes are connected to the communication network and each of said authorized nodes is capable of detecting that any additional node is newly connected to the communication network and sending the communication network a detection signal upon detection of the additional node newly connected to the communication network.

12. A monitor node connected to a bus-type communication network with a plurality of nodes connected thereto, each of said plurality of nodes being any one of an authorized or unauthorized nodes, at least one of said authorized nodes being capable of detecting any additional node newly connected to the communication network and sending the communication network a detection signal upon detection of the additional node newly connected to the communication network, said monitor node comprising:

an input/output device that, via the communication network, receives, from said at least one of said authorized nodes, said detection signal indicating that an additional node is newly connected to the communication network, said additional node being at least one of the authorized and unauthorized nodes; and a detector device that, upon receiving the detection signal, performs a process for determining whether the additional node connected to the communication network is an unauthorized node, wherein when said detector device determines that at least one of the nodes is an unauthorized node while the nodes are operating in an unprotected mode, control is performed for shifting communication between the nodes from the unprotected mode to a protected mode, wherein when said detector device determines that the unauthorized node has been removed from the communication network while the nodes are operating in the protected mode, control is performed for shifting communication between the nodes from the protected mode to the unprotected mode, and wherein the unprotected mode is a mode for directly inputting or outputting digital data without performing an encryption process, and the protected mode is a mode for inputting and outputting digital data while using an encryption process to thereby prevent the unauthorized node from using digital data output from any one of the authorized nodes.

13. A transmission/reception node connected to a bus-type communication network for transmitting and receiving digital data via the communication network, said transmission/reception node comprising:

a control device that controls input/output of the digital data through the communication network in a selected one of an unprotected mode and a protected mode, wherein the unprotected mode is a mode for directly inputting and outputting the digital data via the communication network without performing thereon cryptographic data processing, and wherein the protected mode is a mode for inputting and outputting digital data via the communication network while performing cryptographic data processing thereon to thereby prevent the digital data outputted from an authorized node from being utilized by an unauthorized node connected to the communication network;

an input device that receives, from the communication network, a first instruction for switching from the unprotected mode to the protected mode or a second instruction for switching from the protected mode to the unprotected mode; and a mode selection device that, on the basis of said first instruction received via said input device, controls said control device to shift from the unprotected mode to the protected mode and that, on the basis of said second instruction received via said input device, controls said control device to shift from the protected mode to the unprotected mode.

14. A transmission/reception node as recited in claim 13 which further comprises a device that detects that any additional node is newly connected to the communication network and sends the communication network a detection signal upon detection of the additional node newly connected to the communication network.

15. A transmission/reception node as recited in claim 13 wherein the protected mode prevents the digital data from being received by said unauthorized node by inputting/outputting the digital data having undergone a predetermined encrypting process.

16. A transmission/reception node as recited in claim 13 wherein the protected mode prevents the digital data from being received by said unauthorized node by inhibiting input/output of the digital data from being conducted via the communication network.

17. A transmission/reception node connected to a bus-type communication network for transmitting and receiving digital music data via the communication network, said transmission/reception node comprising:

a control device that controls input/output of the digital data though the communication network in a selected one of an unprotected mode and a protected mode, wherein the unprotected mode is a mode for directly inputting and outputting the digital data via the communication network without performing thereon cryptographic data processing, and wherein the protected mode is a mode for inputting and outputting digital data via the communication network while performing cryptographic data processing thereon to thereby prevent digital data outputted from an authorized node from being utilized by an unauthorized node connected to the communication network;

an input/output device that sends a predetermined encrypted code to the communication network and, via the communication network, receives, from another node having received the encrypted code, a reply that indicates whether said other node is duly authorized;

a detector device that detects, in response to the reply received by said input/output device, whether said other node connected to the communication network is an unauthorized node; and a mode selecting device that, on the basis of the reply received by said input/output device, controls said control device to shift from the unprotected mode to the protected mode or from the protected mode to the unprotected mode.

18. A transmission/reception node as recited in claim 17 wherein the protected mode prevents the digital data from being received by said unauthorized node by inputting/outputting the digital data having undergone a predetermined encrypting process.

19. A transmission/reception node as recited in claim 17 wherein the protected mode prevents the digital data from being received by said unauthorized node by inhibiting input/output of the digital data from being conducted via the communication network.

20. A system comprising a plurality of said transmission/reception nodes as recited in claim 17 that are connected to a communication network, said system preventing unauthorized copying of data by an unauthorized node by executing the protected mode.

21. A method for preventing unauthorized copying, by an unauthorized node connected to a bus-type communication network, of digital data outputted from an authorized node connected to the communication network, said method comprising the steps of:

causing one or more authorized nodes connected to the communication network to operate in an unprotected mode, as a data input/output mode of said authorized nodes, for directly inputting and outputting digital data via the communication network without performing thereon cryptographic data processing;

monitoring the communication network to detect whether any unauthorized node is connected to the communication network; and in response to detection of an unauthorized node connected to the communication network, automatically shifting the data input/output mode of said authorized nodes from the unprotected mode to a protected mode, the protected mode being a mode that performs data processing for inputting and outputting digital data via the communication network while performing cryptographic data processing thereon to thereby prevent the digital data outputted from said authorized nodes from being utilized by said unauthorized node, wherein when said step of monitoring determines that the unauthorized node connected to the communication network has been removed from the communication network, instructs said authorized nodes to shift the input/output operation from the protected mode to the unprotected mode.

22. A method as recited in claim 21 wherein the step for monitoring includes a step of detecting whether any additional node is newly connected to the communication network, and a step of, on the basis of a detection result of the step of detecting, further determining whether an unauthorized node is connected to the communication network.

23. A method as recited in claim 21 which further comprises the steps of:

causing said authorized nodes to detect that any additional node is newly connected to the communication network; and causing said authorized nodes to send a detection signal to a predetermined monitor node connected to the communication network in response to detection of the additional node newly connected to the communication network, wherein in response to receipt of the detection signal, the step of monitoring causes said monitor node to determine whether any unauthorized node is connected to the communication network.

24. A method as recited in claim 21 wherein the step of monitoring includes a step of causing a predetermined node connected to the communication network to send an encrypted secret code to the communication network, a step of causing said predetermined node to receive, via the communication network, a reply, from another node having received and decoded the encrypted secret, that said other node is duly authorized, and a step of causing said predetermined node to determine, on the basis of the reply from said other authorized node, whether any unauthorized node is connected to the communication network.

25. A method as recited in claim 21 wherein said protected mode allows the digital data to be communicated only between said authorized nodes by inputting and outputting, via the communication network, the digital data having undergone a predetermined encrypting process.

26. A system as recited in claim 21 wherein said protected mode prevents the digital data from being received by said unauthorized node by inhibiting input/output of the digital data from being conducted via the communication network.

27. A machine-readable recording medium containing a group of instructions of a program to be executed by a computer, said program implementing a method for preventing unauthorized copying, by an unauthorized node connected to a bus-type communication network, of data outputted from an authorized node connected to the communication network, said program comprising the steps of:

causing one or more authorized nodes connected to the communication network to operate in an unprotected mode for directly inputting and outputting digital data via the communication network without performing thereon cryptographic data processing;

monitoring the communication network to determine whether any unauthorized node is connected to the communication network; and in response to detection of an unauthorized node connected to the communication network, automatically shifting a data input/output mode of said authorized nodes from the unprotected mode to a protected mode, the protected mode being a mode that performs cryptographic data processing for preventing the digital data from said authorized nodes from being utilized by said unauthorized node, wherein when said step of monitoring determines that the unauthorized node connected to the communication network has been removed from the communication network, instructs said authorized nodes to shift the input/output operation from the protected mode to the unprotected mode.

28. A machine-readable recording medium containing a group of instructions of a program to be executed by a computer, said program implementing a process to communicate with a bus-type communication network with a plurality of nodes connected thereto for determining whether said plurality of nodes are authorized or unauthorized, said program comprising the steps of:

sending the communication network a predetermined encrypted code decodable by an authorized node;

receiving a reply from at least one of said plurality of nodes having received the encrypted code;

determining, in response to the reply received by said step of receiving, whether at least one of said plurality of nodes connected to the communication network is an unauthorized node;

when said step of determining determines that at least one of the nodes is an unauthorized node while the nodes are operating in an unprotected mode of communication, causing the authorized nodes to shift from the unprotected mode of communication to a protected mode of communication;

when said step of determining determines that all of the nodes are authorized nodes while the nodes are operating in the protected mode of communication, causing the authorized nodes to shift from the protected mode to the unprotected mode of communication, wherein the unprotected mode of communication is a mode for directly inputting or outputting digital data without performing an encryption process, and the protected mode of communication is a mode for inputting and outputting digital data while using an encryption process to thereby prevent any unauthorized node from using digital data output from any one of the authorized nodes.

29. A machine-readable recording medium containing a group of instructions of a program to be executed by a computer, said program implementing a process to communicate with a bus-type communication network for transmitting and receiving digital data via the communication network, said program comprising the steps of:

controlling input/output of the digital data through the communication network in a selected one of an unprotected mode and a protected mode, wherein the unprotected mode is a mode for directly inputting and outputting the digital data via the communication network without performing thereon cryptographic data processing and, wherein the protected mode is a mode for inputting and outputting digital data via the communication network while performing cryptographic data processing thereon to thereby prevent the digital data outputted from an authorized node from being utilized by an unauthorized node connected to the communication network;

receiving, from the communication network, a first instruction for switching from the unprotected mode to the protected mode or a second instruction for switching from the protected mode to the unprotected mode;

shifting, on the basis of said first instruction received, from the unprotected mode to the protected mode; and shifting, on the basis of said second instruction received, from the protected mode to the unprotected mode.

30. A machine-readable recording medium as recited in claim 29 which further comprises the steps of:

sending a predetermined encrypted code to the communication network;

via the communication network, receiving, from another node having received the encrypted code, a reply that indicates whether said other node is duly authorized;

determining, in response to the reply, whether the other node connected to the communication network is an authorized node or an unauthorized node; and when said step of determining determines that the other node is an unauthorized node, producing an instruction to execute the protected mode.

31. A system as recited in claim 1 wherein at least one of said authorized nodes connected to the communication network detects any additional node being newly connected to the communication network and sends the communication network a detection signal upon detection of the additional node newly connected to the communication network, wherein, upon receiving said detection signal, said monitor node determines whether any unauthorized node is connected to the communication network, and wherein when the additional node is detected, said authorized node waits until it is determined that the additional node is an authorized node or an unauthorized node.

32. A transmission/reception node as recited in claim 13, further comprising:

a device that detects that any additional node that is newly connected to the communication network and sends the communication network a detection signal upon detection of the additional node newly connected to the communication network; and a section that holds processing in said transmission/reception node until a reply indicating that the additional node is an authorized node or an unauthorized node is received from the communication network after the detection signal is sent to the communication network.

* * * * *